Aug. 24, 1965

A. F. HICKMAN 3,202,439

TANDEM AXLE SPRING SUSPENSION

Filed June 11, 1962

INVENTOR.
Albert F. Hickman
BY
Popp and Somme
ATTORNEYS.

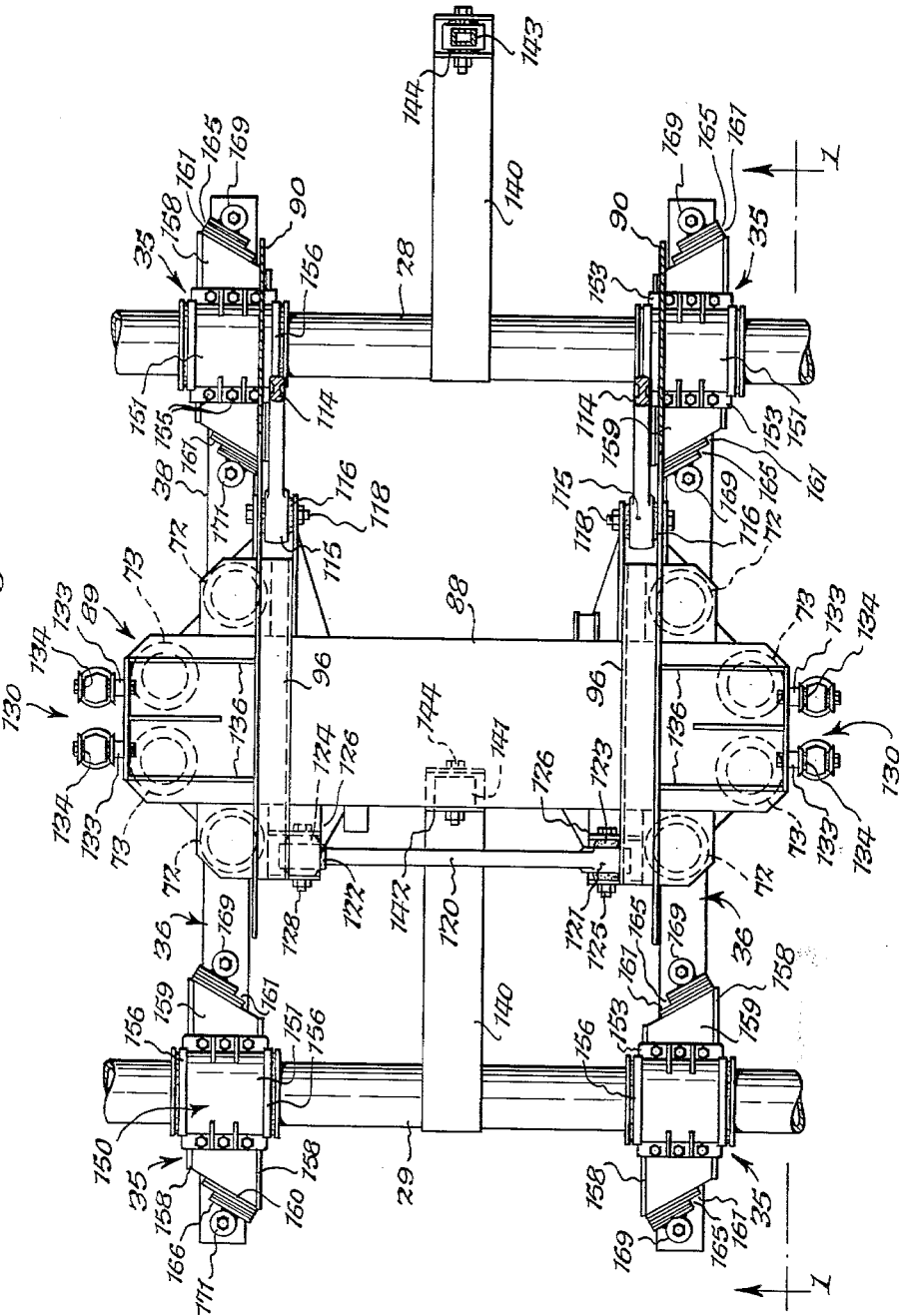

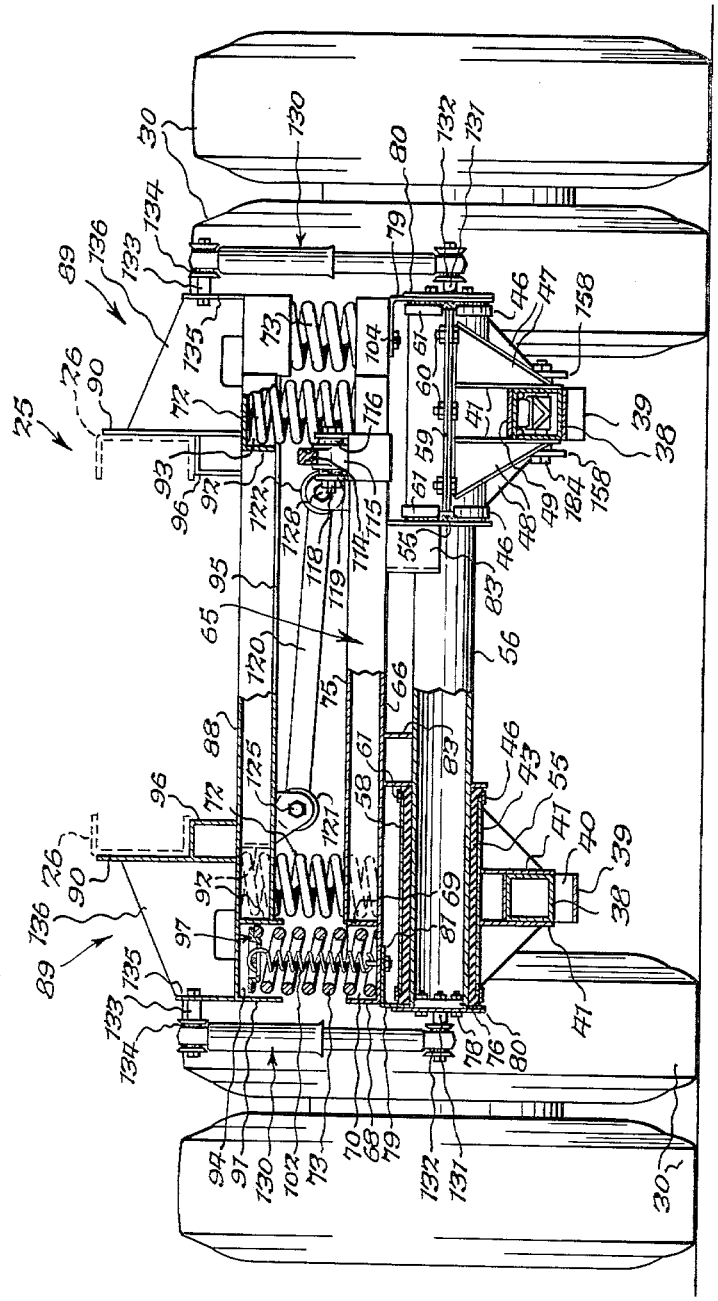

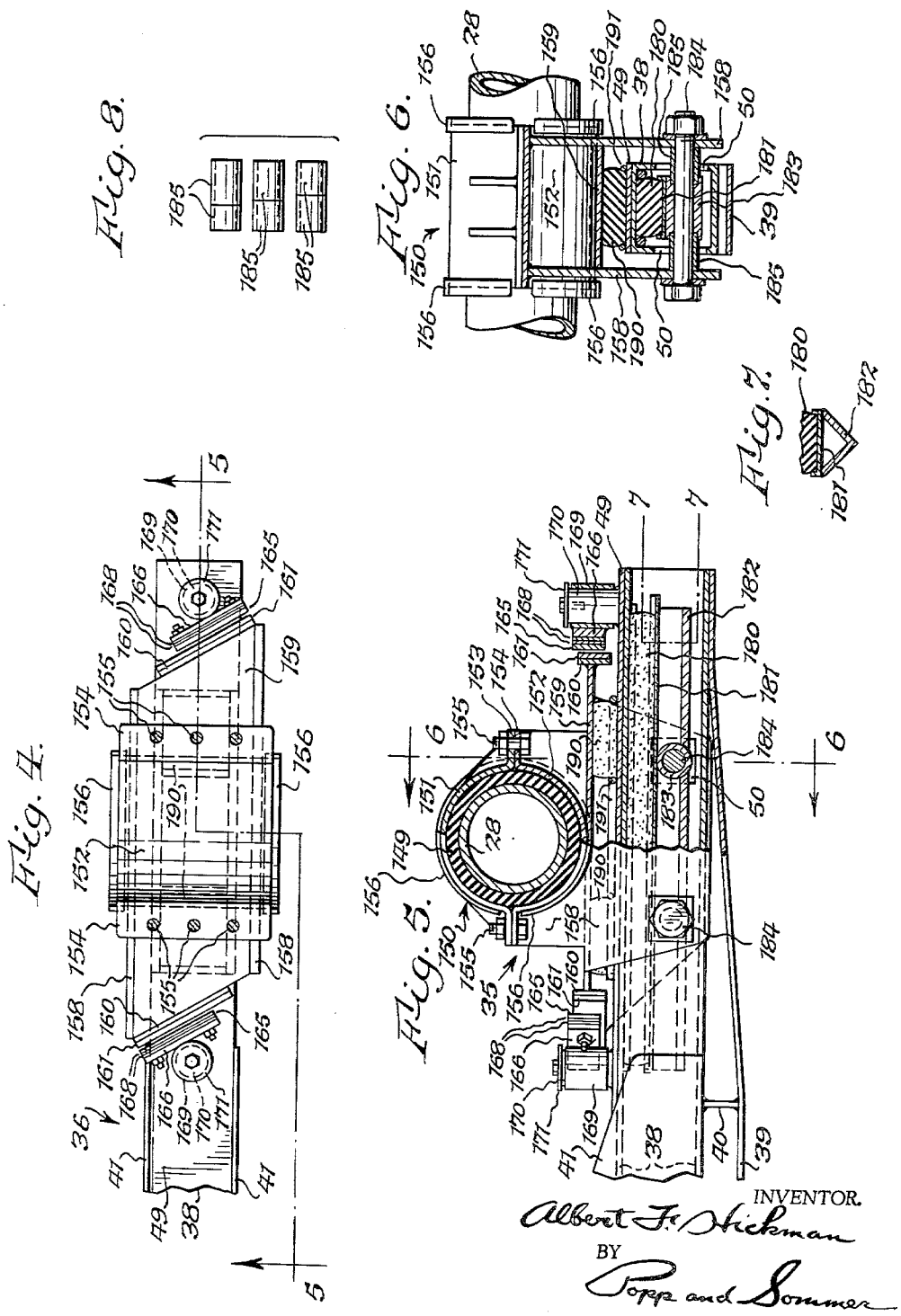

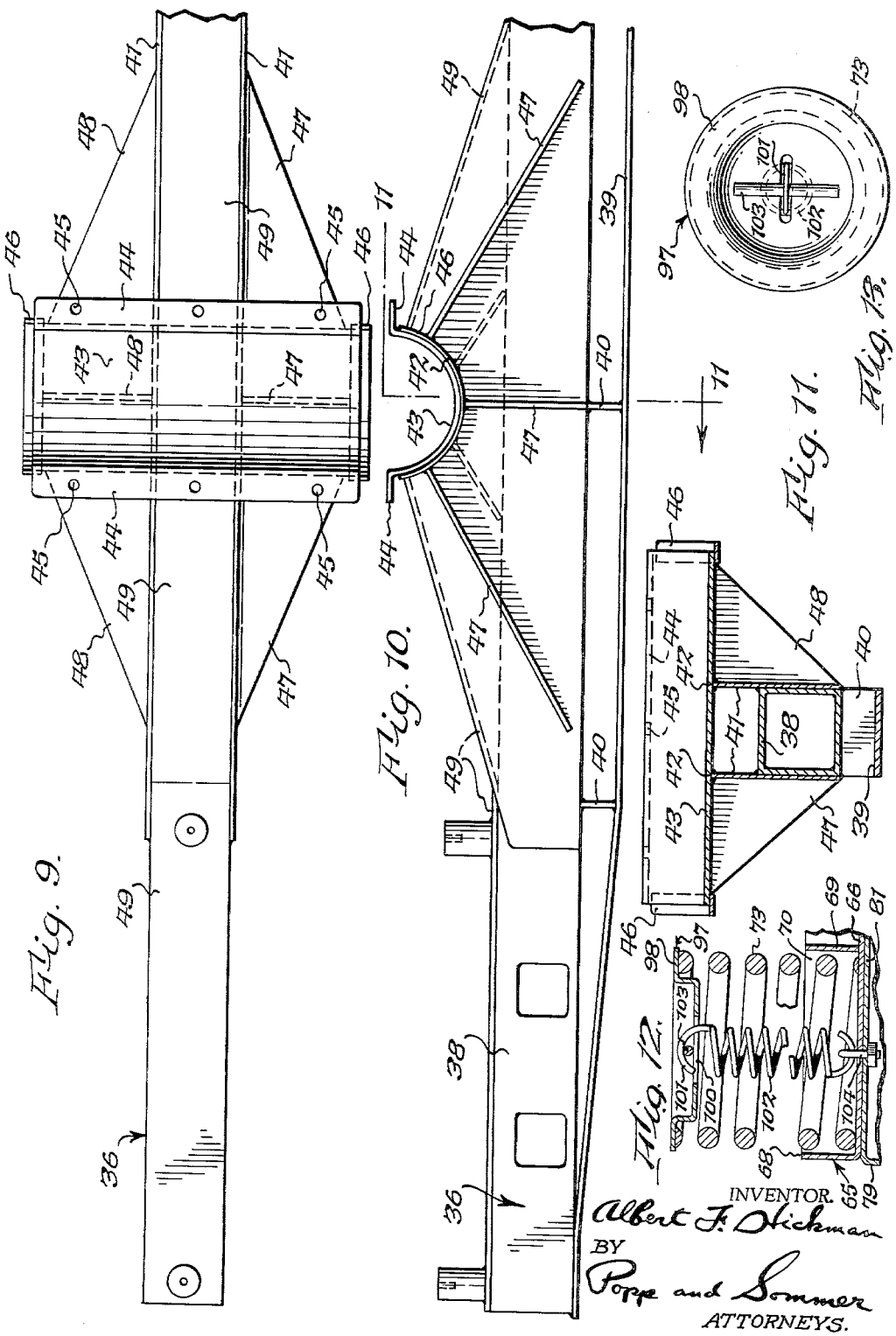

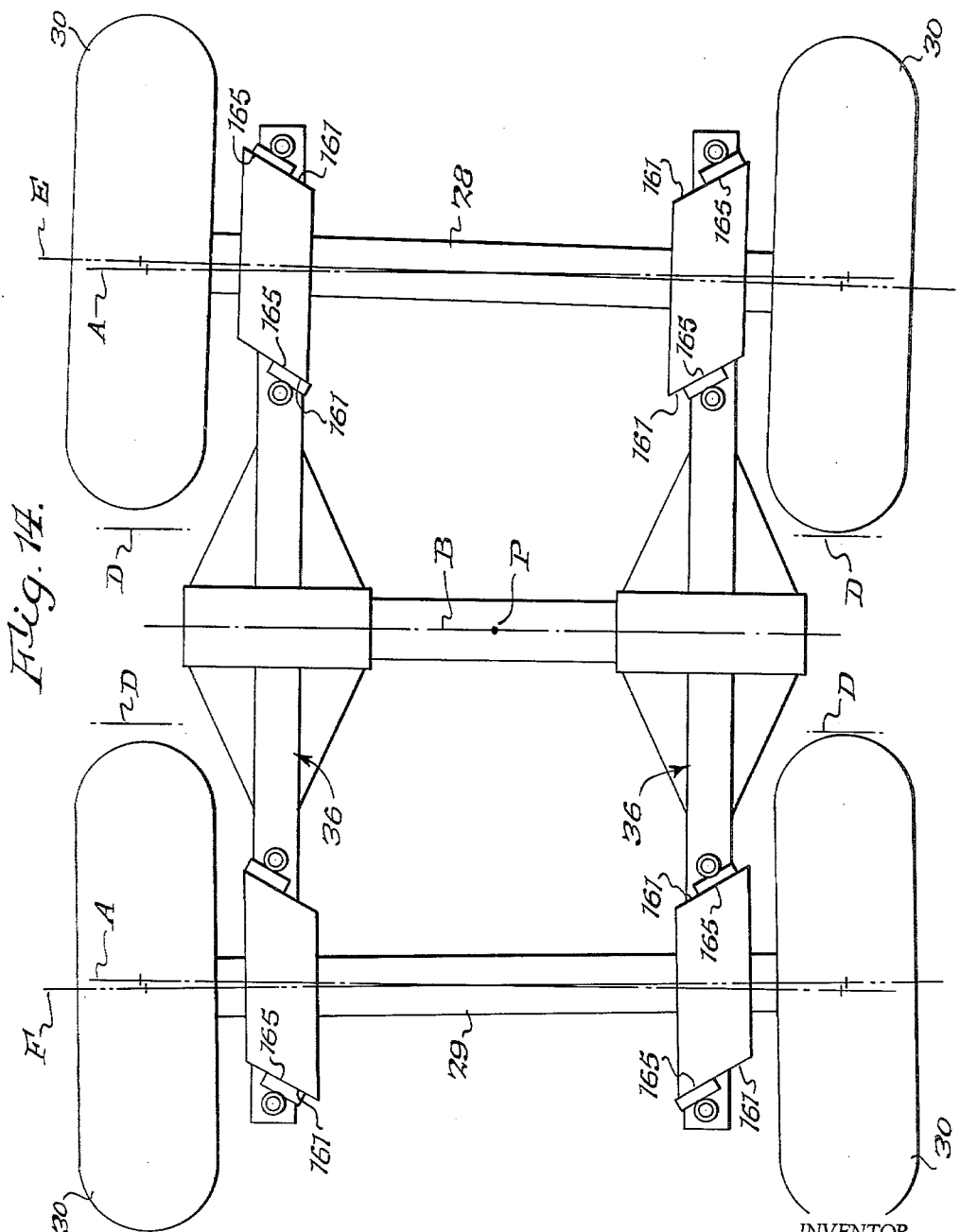

United States Patent Office 3,202,439
Patented Aug. 24, 1965

3,202,439
TANDEM AXLE SPRING SUSPENSION
Albert F. Hickman, Eden, N.Y.
Filed June 11, 1962, Ser. No. 201,585
5 Claims. (Cl. 280—104.5)

This invention relates to a tandem axle spring suspension for trucks, trailers and passenger busses.

This application is a companion to my copending application Serial No. 25,445, filed April 28, 1960 for Spring Suspension for Tandem Axle Vehicles now Patent No. 3,069,184, dated December 12, 1962, and Serial No. 91,101, filed February 23, 1961 for Tandem Axle Spring Suspension, now Patent No. 3,129,953.

In common with the said copending applications, an important general object of the present invention is to provide a tandem axle suspension which is adapted for heavy duty trucks having wide bodies for duel tires with only a few inches of space between the body and the nearby dual tires, and also is adapted for heavy duty trucks with a so-called extended wheel base tandem suspension, such extended wheel base tandem axles being required to carry maximum loads in certain states and having a wheel base increased from the usual 53 inches to 96 inches.

Another important general object is to provide such a suspension which will permit the large amount of vertical axle movement required for highway vehicles to provide a vertical ride as soft as load heights will allow and at a low frequency.

Another important general object is to provide such a suspension which is free from friction but is controlled by an increased resistance to motion in proportion to the amplitude and velocity of vertical frame movement.

Another important general object is to provide such a suspension in which lateral and vertical movement of the unsprung components, as well as a slight movement thereof lengthwise of the vehicle frame, are permitted and resiliently restricted, the lateral and vertical resilience being sufficient, both when the vehicle is loaded and unloaded, to absorb horizontal thrust of the axles, laterally of the frame particularly resulting from one wheel moving up and down relative to the others, thereby to provide increased safety, tire and gasoline mileage, and stability.

Another general object is to provide a gearless compensating means connecting the companion ends of the tandem axles and through which excess load on one wheel is transmitted to its companion wheel.

Another general object is to provide such a suspension consisting of compact units which are arranged so as not to interfere with the frame and axle movement and in which the moving parts are arranged immediately inside and close to the wheels and are high enough to provide high and wide support for the body on the axles with resulting increased stability.

Another general object is to provide such a suspension which can be removed and replaced, with the axles, walking beams and wheels, as a unit, so that field repairs can be avoided and the hold-up of trucks for repairs of their suspensions can be reduced to a minimum.

Another general object is to provide such a suspension which can be have softer springs than those now on the market for equivalent duty and at the same time have greater sidesway control through high and wide spring mountings.

Another general object is to provide such a tandem axle suspension having softer springs than those on the market and which are flexible laterally and fore-and-aft of the vehicle and in which such flexibility is adequately controlled so as not to be excessive.

Another general object is to provide reduced height change of the body, from empty to loaded, preferably keeping this change to about two inches, and at the same time providing a soft, low frequency ride with improved stability and sidesway control.

Another general object is to provide such a suspension which can have many years and hundreds of thousands of miles of carefree operation without repairs of servicing.

Other general objects are to provide such a suspension which is light in weight, particularly in unsprung weight; in which little shock absorber control is required; which is low in both initial cost and upkeep; which renders auxiliary devices for the control of sidesway unnecesaary; and in which periodic vibration of the suspension is dampened out.

An important specific object of the present invention is to provide simplified connections between the ends of the axles and the walking beams which fully accommodate automatic steering of the tandem axles in steering in and out of traffic, automatic axle alinement on the straightaway, and full axle compensation or load transfer from axle to axle even when one or more wheels of the suspension encounters road undulations twelve inches or more in height or depth.

Another important specific object of the invention is to accomplish such automatic steering, automatic axle alinement and axle compensation through oversize rubber components which are compressed, and flexed in their action, will within the stress limits so that their life is determined only by rubber aging in which the life expectancy can be over seven years.

Another specific object is to provide full universal movement in the connections between the walking beams and the axles, which insures against binding, and at the same time obtains automatic steering and wheel alinement and all through low stressed rubber components.

Another specific object is to support the ends of the walking beams on the ends of the axles through rubber pads compressed between these parts to provide positive and solid support for the vehicle frame and load, such support also permitting friction free, horizontal, self-centering through the ability of the rubber pads to stress sidewise but tending to center themselves.

Another specific object is to provide an advantageous underslung support from the axle ends to the walking beam ends, this being accomplished through saddles which form a part of bearing members journalled on the axle ends and having underslung parts extending under the walking beam ends.

Another specific object is to provide such a saddle support in which the working parts are protected from the weather, this being achieved by having the underslung parts of the saddles extend through side holes in tubular walking beams so that the interposed rubber pads can be housed within the tubular walking beams.

Another specific object is to provide rubber pads which will function to permit self steering and axle compensation but will not drift.

Another specific object is to provide simple and effective resilient resistancy to rebound of the axle, this again being achieved through simple rubber pads which also permit self-steering and axle compensation and tend to center the parts for proper wheel alinement on the straightaway.

Another specific object is to provide simple and effective guides between each saddle structure and the companion walking beam end which provides positive self-steering, this being achieved by angularly disposed vertical pairs of guide plates on the walking beam ends and saddle structures, respectively, and which translate the movement of each tandem axle lengthwise of its axis (which occurs as a consequence of turning to one side or the other) into displacement of one end the axle toward the front and the other end toward the rear of the vehicle to steer the axle in the directions of the curve being followed by the front steering wheels.

Other objects and advantages of the invention will be apparent from the following description and drawings in which:

FIG. 2 is a fragmentary top plan view, partly in section, of the suspensions shown in FIG. 1, this section being taken generally on line 2—2, FIG. 1, the vehicle again being unloaded.

FIG. 3 is a vertical tranverse section through the spring suspension taken generally on line 3—3, FIG. 1, looking toward the rear of the unloaded vehicle.

FIG. 4 is an enlarged fragmentary sectional view taken generally on line 4—4, FIG. 1.

FIG. 5 is a fragmentary vertical longitudinal section, partly in elevation, taken generally on line 5—5, FIG. 4.

FIG. 6 is a vertical transverse section taken generally on line 6—6, FIG. 5.

FIG. 7 is a fragmentary vertical transverse section taken generally on line 7—7, FIG. 5.

Figure 1:
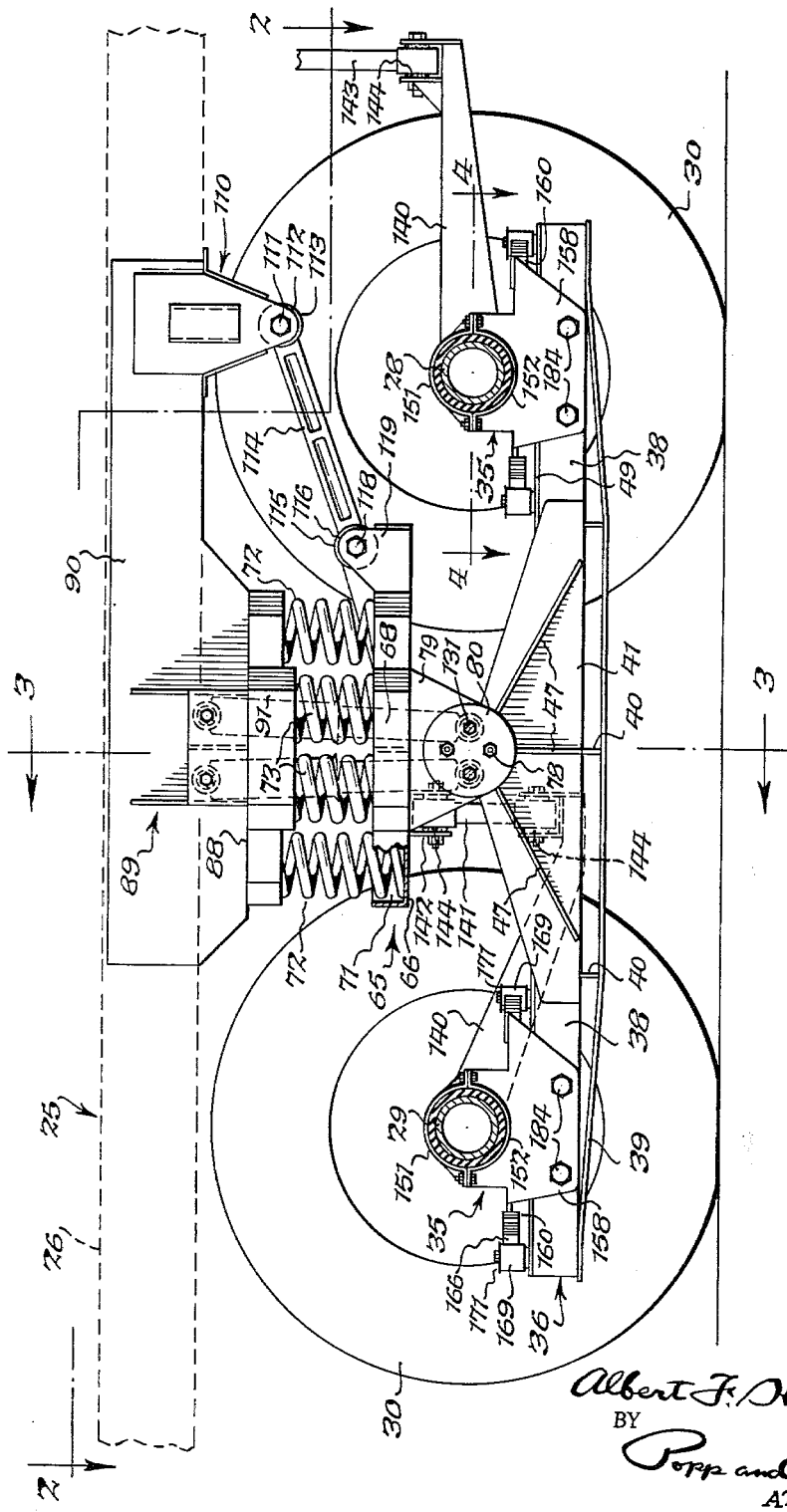
FIG. 1 is a fragmentary side elevation of the rear end of an unloaded tandem axle vehicle having a suspension embodying the present invention, the axles being shown in section, and the section being taken generally along line 1—1, FIG. 2. As viewed in FIG. 1, the front of the vehicle is toward the right.

FIG. 8 is a detached side elevation of different groups of spacer sleeves 185 showing the manner in which they can be used in pairs to obtain different laterally positioned mountings of the axle saddles 35 on the ends of the walking beams 36.

FIG. 9 is a fragmentary top plan view of one of the walking beams of the suspension, this walking beam being shown detached from the rest of the suspension.

FIG. 10 is a side elevational view thereof.

FIG. 11 is a vertical transverse section taken generally on line 11—11, FIG. 10.

FIG. 12 is a fragmentary view similar to FIG. 3, on an enlarged scale, and in particular illustrating the mounting of each second stages heavy duty spring in such manner that it will not rattle about when not in service.

FIG. 13 is a top plan view of the sceond stage heavy duty spring mounting as shown in FIG. 12.

FIG. 14 is a diagrammatic top plan view of the spring suspension, particularly illustrating the manner in which self-steering of the tandem axle is achieved. In this figure, the front of the vehicle is again toward the right.

The invention is illustrated as being in the form of a heavy duty tandem axle suspension for wide bodied, large tired trucks or trailers. As to such wide bodied, large tired trucks, present load laws limit the maximum overall width of the highway trucks to 96 inches. Heavy duty trucks have a frame width of 34 inches, and with 11 inch spaced dual tires, this leaves only from 5 to 6 inches between the tires and each side of the frame to accommodate the suspension and with the present invention, the space must contain large enough helical compression springs to support the load and provision must also be made to accommodate a substantial lateral axle movement, that it, at least one inch of axle movement lengthwise of their axes in either direction.

The main frame 25 of the vehicle can be of any suitable construction and is shown as comprising a pair of longitudinal side frame bars 26, shown in dotted lines, these longitudinal side frame bars usually being in the form of inwardly facing channels which are shown as straight and parallel and are connected by the usual cross bars (not shown).

The frame is shown as supported by a pair of tandem axles 28 and 29 which in turn are supported by rubber tired wheels 30, these wheels being rotatably secured on these axles. One or both groups can be drive wheels, the axle 28 being the front axle and the axle 29 being the trailing axle. Each end of each of the axles 28, 29 is connected by a saddle structure, indicated generally at 35, to one end of a walking beam 36, these saddle structures forming an important part of the present invention in obtaining automatic steering and proper axle alinement as will be described in greater detail.

Each walking beam comprises a square tube 38 made of a high strength alloy, this tube being reinforced by plates of normal steel welded thereto to provide a walking beam of adequate strength to support the vehicle. To this end a longitudinal bottom strap 39 is welded at its ends to the undersides of the ends of the high strength alloy tube 38, and at its center is spaced from this tube by three transverse spacers 40 suitably welded in position so that these straps and spacers 39, 40 form a bottom truss for the high strength alloy tube 38. To the opposite sides of each of the high strength alloy tubes 38 is welded a plate 41, these plates being in centered relation to the walking beam and being provided with transversely alined semicircular recesses 42 in which is welded a lower half bearing member 43. These lower half bearing members 43 are shown as being in the form of semicylindrical steel shells having horizontal outwardly projecting flanges 44 along their longitudinal edges, these flanges being with bolt holes 45. Each lower half bearing member 43 is provided at its opposite ends with semicircular extensions or half rings 46 welded to and extending axially beyond the ends thereof to form spaces for the ends of a rubber bushing as hereinafter described.

Each lower half bearing member 43 is reinforced at its opposite ends by a vertical triangular reinforcing gusset plate 47 arranged in a plane which intersects the axis of the lower half bearing member 43. Each lower half member bearing is additionally reinforced by additional triangular gusset plates 48 at each side of the tube similar to the gusset plates 47 but arranged in divergent angularity thereto Each pair of side plates is also reinforced by a pair of straps 49 welded to and connecting their upper edges, these straps being welded at their ends to opposite sides of the lower half bearing member 43 and the opposite or remote ends of these straps extending along the top face of the high strength alloy tube 38 to the opposite ends thereof as best shown in FIGS. 9 and 10. At its opposite ends the high strength alloy tube 38 is provided with two pairs of transversely alined, horizontally extending square openings 50 to accommodate portions of the saddle structure 35 as hereinafter described.

Each lower half bearing member 43 supports a rubber bushing 55 which supports the corresponding end of a cross tube 56 which it surrounds. This rubber bushing is held in compressive relation with this cross tube by a top half bearing member 58 which is in the form of a complementary semicylindrical shell having outwardly extending flanges 59 along its longitudinal edges and secured to the flanges 44 by bolts 60. As with the lower half bearing member 43, the upper half bearing member 58 is also provided at its opposite ends with semicircular or half ring 61 welded to the outside face thereof to extend axially beyond the half bearing member and provides space for the ends of the rubber bushing 55.

The cross tube 56 supports a bolster 65 which is welded thereto and which is preferably constructed as follows:

This bolster comprises a bottom plate 66 arranged above and extending the full length of the cross tube 56 and having an upwardly projecting marginal rim 68 and having at its ends internal upwardly projecting ribs or partitions 69 forming, with the marginal rim 68 upwardly opening springs pockets at each end of the bolster. As with the spring suspension disclosed in my said copending application, Serial No. 91,101 for Tandem Axle Spring Suspension, two of these pockets, indicated at 70, are close to the center line of the bolster 65 and are outboard, transversely of the vehicle, with reference to the other pair of pockets 71, the latter containing lower ends of a pair of relatively light helical compression springs 72, the axes of which are in a common vertical plane which lies between the main longitudinal side bar 26 of the frame 25 and the rubber tired wheels 30, and the former supporting a pair of heavy duty helical compression springs 73, the axes of which lie in a common vertical plane which intersects the inner rubber tired wheels 30 of both tandem axles as well as the outer extremity of the cross tube 56.

Between the groups of pockets at opposite ends of the bolster 65 is provided a top plate 75 which is suitably welded to the corresponding parts of the upstanding marginal rim 68 and internal partitions 69, as best illustrated in FIG. 3. To secure the bolster 65 to the cross tube 56, a plug or end head 76 is welded in each of the cross tube 56 and to each plug or end head 76 is secured, as by bolts 78, an end plate 79 and circular disk 80, the end plate 79 projecting upwardly from the cross tube and having a horizontal flange 81 projecting inwardly toward the center of the vehicle in contact with the underside of the bottom plate 66 of the bolster 65 and being secured thereto by welding or in any other suitable manner. These end plates 79 also form end stops for the semi-circular or half ring extensions 46 and 61 of the housing the outer end of each rubber bushing 55. These semicircular half rings 46 and 61 are at the outer ends of each half bearing 43 and 58. The bolster 65 is supported on the cross tube 56 by a pair of brackets 83, the upper sides of which are welded to the bottom of the bolster 65 and the lower parts of which embrace the cross tube 56 and are welded thereto. These brackets also form stops for the semicircular half rings 46 and 61 at the inner or opposing ends of the split housing 48, 58 for the rubber bushings 55.

It will be noted from an inspection of FIGS. 3 and 12 that in the unloaded condition of the truck, the pair of light duty springs 72 are longer than the pair of heavy duty springs 73, this being for the purpose of supporting the truck only on the light duty springs 72 when the truck is travelling along without a load, and to cut the heavy duty springs 73 into service only when the truck is loaded.

For this purpose, the upper ends of the light duty springs 72 are in constant contact with the underside of a horizontal plate 88 forming the bottom plate of a pair of frame brackets indicated generally at 89, this bottom plate extending outwardly from the adjacent main longitudinal side frame bar 26 of the vehicle frame and being common to the two frame brackets 89. To each end of the plate 88 is welded an upstanding vertical main side plate 90 which is arranged along the outer face of the corresponding main longitudinal side frame bar 26 and connected thereto in any suitable manner. This plate extends forwardly of the vehicle to a position above the front axle 28 for a purpose which will presently appear. As previously indicated, the plate 88 is common to both the side frame brackets 89 and this plate has a depending marginal rim 91 and internal depending ribs or partitions 92, which partitions are arranged to form downwardly opening pockets 93 and 94, respectively, for the light duty and heavy duty helical compression springs 72 and 73. Between these end pockets, a bottom plate 95 is welded to the undersides of the corresponding internal cross ribs 92 and depending side rim 91. To provide the required body height, the main longitudinal side beams 20 of the frame can be mounted on steps or chairs 96.

It is desirable to keep the heavy duty springs 73 from bouncing around and creating an objectionable noise when these springs are out of service, as when the truck is travelling along without a load. To this end, as best shown in FIGS. 3, 12 and 13, each heavy duty spring 73 is provided with a circular cap 97, this cap having an elevated rim 98 which rests on the heavy duty spring 73 and having a depressed or cup-shaped central portion fitted into the top of the heavy duty spring 73. This depressed central portion is provided with a transverse slot 100 through which is inserted the upper hook or loop 101 of a very light duty helical tension spring 102. Above the cap 97, this hook 101 embraces a horizontal cross pin 103, this cross pin being held against endwise displacement by the raised rim portion 98 of the cap 97. The lower end of the helical tension spring 102 can be secured, as by a bolt 104, to the bottom of the pocket 70 which contains the bottom of the heavy duty spring 73 as best shown in FIG. 12. The helical tension spring 102 is constantly under tension and consequently exerts downward pressure on its heavy duty spring 73, even when the truck is unloaded and the upper end of each of these heavy duty springs 73 is out of operative contact with the frame bracket 89.

The bolster 65 is constrained in its movement both transversely and longitudinally of the vehicle by radius rods which radius rods are, however, rubber bushed so as to provide resilience in their restraining the bolster to move in a substantial vertical path with reference to the vehicle frame. For this purpose, as previously indicated, the vertical attaching plate 90 of each axle bracket extends a substantial distance forwardly from the horizontal bottom plate 95, and at its forward end this vertical attaching plate 90 has attached thereto a depending frame bracket 110, the lower end of which carries a horizontal pivot pin in the form of a horizontal bolt 111 extending transversely of the vehicle frame. This bolt in turn carries a rubber bushing 112 which is compressively embraced by the knuckle 113 of a radius rod 114. Each of these radius rods extends towards the rear of the vehicle and has its other end provided with a knuckle 115 pivotally secured to a rubber bushing 116 surrounding a horizontal pivot pin 118 projecting from horizontal ears 119 at the opposite ends of the bolster 65.

The transverse radius rod is indicated at 120 and is provided at its opposite ends with knuckles 121, 122, respectively embracing rubber bushings 123 and 124. The rubber bushing 123 embraces a pivot pin in the form of a horizontal bolt 125 secured through a bracket 126 to the underside of the plate 95 forming part of the connected frame brackets 89. The other bushing 124 embraces a pivot pin in the form of a horizontal bolt 128 which is secured through a bracket 126 on the upper side of the top plate 75 of the bolster 65.

Preferably a small degree of shock absorber control at each end of the cross tube 56 is desirable and to this end, shock absorbers indicated generally at 130 are provided, a pair of such shock absorbers being provided at each side of the vehicle. These shock absorbers are shown as being of the telescopic type, the lower end of which is pivoted, by a pivot pin 131 and surrounding rubber bushing 132, to the plug 76 welded in each end of the cross tube 56. The upper end of each shock absorber is shown as being pivoted, by a pivot pin 133 and surrounding rubber bushing 134, to a vertical side plate 135 welded to and forming a part of the corresponding frame bracket 89. Preferably this plate 135 is reinforced by vertical webs or gussets 136 connecting with the main side plates 90 of the frame brackets 89. These hydraulic shock absorbers 130 are of the single acting type, offering no substantial impedance to the upward movement of the cross tube 56 toward the vehicle frame 25, but imposing substantial resistance to the downward or rebound movement of the tube 56 and bolster 65, under operating conditions.

The suspension is also shown as including axle torque arms 140 which are effective against a brake and drive torque reactions. Each torque arm 140 is welded to the corresponding axle 28 and 29 near the center thereof, to project horizontally toward the front end of the vehicle. The torque arm 140 of the rear tandem axle 29 can be connected by a vertical rod 141 to a bracket 142 secured to the underside of the bolster 65. The forward end of the forward torque arm 140 can be pivotally connected through a vertical rod 143 to the frame 25 in any suitable manner (not shown). Rubber bushings 144 are preferably included in the joints at the ends of these torque arms 140.

As previously indicated, an important feature of the invention resides in the saddle structure 35 which supports each end of each axle 28, 29 on the corresponding end of the walking beam 36 in such a manner as to render these tandem axles self-steering as illustrated in FIG. 14, and also to provide full cushioned universal connections between each walking beam and each axle end and to render all parts self alining through low stressed rubber components. To this end each saddle structure is preferably constructed as follows:

Each end of each axle 28, 29 is embraced by a rubber bearing bushing 149 of a bearing 150 which in turn is embraced by an upper half bearing member 151 and a lower half bearing member 152 these members having, respectively, outwardly extending flanges 153 and 154 along their longitudinal edges and which flanges are bolted together by bolts 155 so as to keep the rubber bearing bushings 149 in compressive relation with the axle ends and with the half bearing members. To accommodate radial expansion of the protruding ends of the rubber bushings 149 half rings 156 are welded to the periphery of each half bearing member to protrude beyond the ends thereof and to act as stops limiting the endwise movement of these housings.

A transverse side plate 158 projects downwardly from each end of each of the lower half bearing members 152 and embraces the end of the corresponding walking beam 36 in spaced relation thereto as best shown in FIGS. 5 and 6. A horizontal plate 159 is interposed and welded to each pair of vertical side plates 158, this horizontal plate also contacting the bottom of the lower half bearing member 152. A feature of the invention resides in the provision of a vertical angularly disposed guide plate 160 at each end, fore-and-aft, of the vehicle, of each horizontal plate 159, these vertical plates being in the required angle, with reference to the axles which they support, to effect self-steering of the axles. This angularity is such that these plates toe out toward the front of the vehicle, and these self-steering plates 160 are preferably provided with removable wear plates 161 which act as their wearing surfaces.

These wear plates act against wear plates 165 removably attached to an angular self-steering backing plate 166 with interposed shim plates 168 to permit of adjusting the spaces between the wear plates 165 and 166. To permit each backing plate to swing about a vertical axis and insure full face contact at all times between it and the wear plate 161 of the corresponding guide plate 160, to the back of each backing plate 166 is welded a vertical sleeve 169 which is journalled on a pin 170 fixed to and rising from the top plate 49 of the walking beam 36. A removable cap 171 can replaceably retain each sleeve 169 and plates 165, 166 on the pins 170.

The downward pressure of each end of each walking beam 36 is transmitted through the corresponding saddle structure 35 as follows:

The numeral 180 represents a long rectangular pad of resilient rubber, say 50 durometer, arranged within each end of the square high straight alloy tube 38 which forms the backbone of each walking beam and maintained in upward pressure contact with the underside thereof. The underside of each rubber pad 180 is supported by a plate 181 having upwardly flanged longitudinal edges which is in turn supported along its longitudinal edges by a V-shaped or longitudinally trough-shaped plate 182 as best shown in FIG. 7 and to which it can be secured in any suitable manner. This V-shaped plate has a pair of transverse bushings 183 welded therein in line with the clearance square openings or holes 50 through the square high strength alloy tube 38 of the walking beam. Bolts 184 extend through these bushings 183 and square holes 50. The ends of these bolts are anchored in the bottoms depending side plates 158 of the lower half bearing member 152. Spacer sleeves 185 are interposed between the ends of these bushings and depending side plates and provide a convenient way of adjusting the lateral position of the ends of the walking beam 36 with reference to the axle ends by providing these spacing sleeves in different lengths as illustrated in FIG. 8.

An important feature of the invention resides in the provision of rebound cushions 190 in each end of each walking beam 36. These are in the form of a pair of rubber pads or biscuits under compression between the top strip 49 of the tubular backbone 38 and the horizontal cross plate 159 of each saddle structure 35. Each biscuit 190 can be retained in place by a base frame 191.

*Operation*

In the operation of the suspension, the upward movement of one end of, say the front tandem axle 28, effects upward movement of the axle saddle structure 35 fixed therein to effect upward movement of the front end of the corresponding walking beam 36.

This upward movement of the front end of one walking beam 36 raises its split rock sleeve 43, 58 (FIG. 3) at the center of the walking beam and which journals, through the corresponding rubber bushing 55, the corresponding end of the cross tube 56. This rubber bushing is of sufficient radial thickness to permit the required rocking of the walking beam 36 and provides a frictionless bearing which is free from lubrication requirements. In the event of extreme lateral forces against the vehicle body, the semicircular stops or half rings 41, 61 welded to and projecting axially outwardly from the opposite ends of the halves 43 and 58 of the rock sleeve engage the end plates 79 and brackets 83 fixed to the cross tube 56, so as to provide positive metal-to-metal stops under such extreme conditions. These half rings 46, 61 permit a limited amount of transverse movement in a horizontal direction of the ends of the walking beams to engage the end plates 79 and brackets 83 to prevent any such movement to excess.

This upward movement of one end of the cross tube 56 raises the corresponding end of the bolster 65 supported by and fixed to this cross tube via the brackets 83 and end plates 79. Assuming that the chassis is unloaded, at this time the heavy or central pair of helical compression springs 73 on the bolster 65 are not in contact with the undersides or plate 88 of the cross connected axle brackets 89. Accordingly, in this upward movement of one end of the bolster 65, no force is transmitted through these heavy or central pair of compression springs 73 and they are merely moved toward contact with the underside of the horizontal bottom plate 95 of the two axle brackets 89. These heavy or central pair of compression springs 73 are held out of service until the body is loaded, by reason of their having insufficient height to reach the horizontal plate 88 of the two bolsters 89 until the chassis 26 is loaded sufficiently to seat these brackets on these heavy duty compression springs. Accordingly, these heavy duty central pair of compression springs act as a second stage spring support. While these heavy duty central pair of compression springs 73 are out of service they are prevented from bouncing around in the brackets 70 and 94 by the small helical tension springs 102 contained therein. Each of these springs, through the cross pin 103 contained within the depressed central part of each cap 97, biases this cap downwardly upon the upper collar of each spring 73, as best shown in FIGS. 3 and 12, to keep the spring from bouncing up and down.

Accordingly, without load on the chassis 25, the force resulting from the upward movement of one end of the bolster 65 is transmitted through the light or outermost pair, lengthwise of the vehicle, of helical compression springs 72 to the corresponding end of the horizontal plate 88 which forms the downwardly facing surfaces of the frame brackets 89. These relatively light helical compression springs 72 are, of course, compressed during this action and provide resilient support for the unloaded truck to provide a first stage of resilient resistance through the relatively light helical compression springs which provide the desired low frequency and action for the empty truck.

In this action the one-way shock absorbers 130 are effective to retard rebound or downward movement of the bolster 65 with reference to the frame 25. Thus the shock absorbers freely permit compression of the relatively light helical compression springs 72 but retard the expansion or rebound action of these springs. These shock absorbers are interposed directly between each axle bracket 89 and the end plate 79 of the cross tube 56 so as to be directly accessible for inspection and at the same time not interferring with the movement of the dual wheels 30.

Assuming that the truck is then loaded, or that the assumed upward movement of the one end of the front axle 28 is of sufficient magnitude, the upward movement of the corresponding end of the cross tube 56 and bolster 65 will cause the upper ends of the heavy duty or central pair of helical compression springs 23 to engage and transmit force to the corresponding axle bracket 89. Accordingly, the loaded chassis 25 is now resiliently supported by the second stage of heavier helical compression springs 73 in addition to the lighter first stage of helical compression springs 72 to provide the required increased resilient resistance for adequate support of the load on the axles. The size and strength of the helical compression springs 72, 73 are selected to provide the spring rate and amplitude of movement best suited to the empty vehicle and to the load to be carried by the vehicle.

Lateral cushioning of the axles 28, 29 is provided essentially by the saddle structures 35. Thus either axle can move lengthwise of its axis, this being permitted by the rubber pads 180 and 190 between the saddle structure 35 at the end of each axle and the adjacent end of the corresponding walking beam 36. Referring to FIG. 6, it will be seen that axial movement of the axle 28 will effect a corresponding movement of the top plate 159 and side plates 158 of the saddle structure 35 and that such movement will cause horizontal sidewise distortion of the rubber top pads or biscuits 190 which support this bottom plate 159 of the saddle structure on the top plate 49 at the end of the square tube 38 which forms the backbone of each walking beam 36. It will also be seen that such movement of each saddle structure 35 lengthwise of the axle 28, as best illustrated in FIG. 6, will also cause a corresponding lengthwise movement of the bolts 184, this movement being permitted by the square holes 50 in each end of each walking beam. Through the spacers 185, this effects a corresponding axial movement of the sleeves 183 to each pair of which is welded the triangular bar 182 and its top plate 181. Accordingly, this movement also causes a horizontal sidewise distortion of the long rubber pad 180 within each end of each walking beam 36. It will be seen that the weight of the body 25 is supported on the rubber pads 180 which are, however, maintained under compression by the top rubber pads 190 which also serve to cushion rebound forces. These rubber blocks 180, 190 tend to center the axles 28, 29, but as just described, permit cushioned horizontal movement of each axle lengthwise of its axis or laterally of the chassis 25, this being important in obtaining self-steering of these axles as follows:

Referring to FIG. 14, this figure illustrates the manner in which self-steering of the axles 28, 29 is achieved in making a right hand turn of the vehicle from a straightaway, the vehicle moving to the right as illustrated in this figure. On the straightaway the vehicle is travelling with the axes A of the axles 28, 29 arranged parallel with each other and with the axis B of the cross tube 56 all of these axes being perpendicular to the straight line of movement so that the wheels 30 are parallel with each other and track behind one another in the straight-ahead travel of the vehicle. The lines D represent the distance between the front and rear tires of the wheels and at this time these distances D are, of course, equal.

When the vehicle makes a turn in the road as to the right as illustrated in FIG. 14, the tires 30 of each of the axles 28, 29 tend to resist the scuffing which would otherwise occur and in doing so push each axle laterally of the frame to eliminate such scuffing. Confining attention to the front axle 28, this lateral movement of the frame lengthwise of the axes of the axles 28, 29 on making the turn displaces the two saddle structures 35 at each end of the axle horizontally so as to cause the wear plates 161 of the self-steering plates 160 to engage the wear plates 165 of the self-steering plates 160 and to cause the working faces of these wear plates 161, 165 to slide along one another. Since these working faces are set at an angle and since these working faces at opposite sides of the chassis toe out toward the front of the vehicle it will be seen that such an assumed lateral movement of the front end of the chassis 25 causes one of the ends of the front axle 28 to be displaced forwardly and its other end to be displaced rearwardly so that the axis of the front axle 28 is now along the line E.

The rear axle 29 is moved axially in the opposite direction. Thus, when the vehicle is steered to the right, the front end of the frame 25 moves about a theoretical pivot point P intermediate the tandem axles. This causes a lateral movement of the chassis in opposite directions relative to the two tandem axles, the body movement illustrated in FIG. 14 being to the right relative to the front tandem axle 28 and to the left relative to the rear tandem axle 29. This causes the left hand end of the front tandem axle 28 to move forwardly and the right hand end of this front tandem axle to move rearwardly. This also causes the left hand end of the rear tandem axle 29 to move rearwardly and the right hand end of the rear tandem axle to move forwardly so that its axis is along the line F. The movement therefore tends to bring the axes of the tandem axles 28, 29 so as to intersect, as illustrated by the lines E and F, the axis of the front steering wheels (not shown) and thereby enable the truck to make the turn without tire scuffing. This self-steering action also takes place to some extent when a tendency to tire scuffing occurs because of one wheel or a pair of wheels have a different diameter from the diameter of the wheel or pair of wheels at the other side of the same axle.

To restrain the unsprung components of the suspension against movement fore-and-aft of the vehicle and at the same time to provide a limited resilient resistance to such movement, the radius rods 114 are provided at each side of the vehicle. These radius rods extend lengthwise of the line of movement of the vehicle and each is connected at one end by a rubber bushing 112 to a pivot pin 111 of a depending frame bracket 110. The opposite end of each of these radius rods 114 is connected, through a rubber bushing 116, to a pivot pin 118 fixed to the forward end of the bolster 65. It will therefore be seen that movement of the unsprung components of the spring suspension fore-and-aft of the vehicle is limited by these radius rods but that the rubber bushings 112 and 116 provide a degree of resilient resistance to this limiting action.

In similar manner movement of the unsprung components of the tandem spring suspension transversely of the frame 25 is resisted by the transverse radius rod 120 in such manner as to cushion this restraining action. Thus, this radius rod is connected to the frame bracket 126 through a rubber bushing 123 while its other end is connected to the bracket 126 through a rubber bushing 124. This radius rod thereby restrains the bolster 65 and its cross tube 56 against horizontal movement laterally of the vehicle frame but in a cushioned manner.

The torque arms 140 fixed to the axles 28, 29 adequately resist all brake and drive torque reactions and through the rod and rubber cushions 144 do not resist axle movement in any direction.

By the high and wide mounting for the helical compression springs 72, 73, particularly the latter, excellent sidesway control is achieved with a sufficient, low frequency ride which these springs provide. The rubber bushings 55 are thick enough to wind up or flex torsionally in response to the oscillation of the walking beams 36 and this wind-up or torsional stress in addition contributes to holding all four groups of wheels, and hence the unsprung weight of the suspension, on the road, particularly when travelling along without a load and at high speeds. A serious problem with heavy vehicles, when laden, is to keep the wheels of the tandem axles on the road at high speeds. Often the unsprung weight is as great or greater than the sprung weight and under such conditions the main spring means between the tandem suspension as a whole and the vehicle frame are less effective in keeping the wheels, particularly individual wheels, on the road. The torsionally flexed rubber bushings 55 utilize the unsprung mass of the vehicle to hold the wheels on the road. As now practiced, this is accomplished in an empty vehicle for high speed travel by chaining one axle up off the road and in that way making it a part of the sprung mass. This is accomplished by the stressed rubber bushings 55 as follows, when travelling unladen at high speed.

When one or two of the wheels 30 rise both of the rubber bushings 55 are twisted or flexed against their internal resistance, and hence the upward movement of the rising wheels not only is not accelerated but instead is resiliently resisted by the bushings the reactive force of which tends to return the rising wheel to contact with the road. These rubber bushings are a part of the unsprung mass and hence this resistance and reactive force of the rubber bushings is a function of the unsprung mass and is independent of both the main vertical cushioning springs 72, 73 and also the sprung mass which, as pointed out above, can be of very reduced effectiveness when empty in holding the wheels on the road. The torsionally flexed rubber bushings 55 are equal or better than chaining one axle up and moreover are effective under all load conditions in holding all four groups of wheels to the road.

By "rubber" as used in the accompanying claims is meant natural rubber, synthetic rubber or mixtures of natural and synthetic rubber.

From the foregoing it will be seen that the present invention achieves the objects and has the advantages set forth, and is a sturdy, low cost suspension free from upkeep and service problems.

I claim:

1. In a tandem axle spring suspension adapted to be interposed between a vehicle frame and a pair of tandem axles each with rubber tired wheels journalled at the ends thereof and the suspension having a tubular walking beam at each side of the frame with its ends adjacent the corresponding axle ends and means resiliently supporting said frame on the central portions of said walking beams and permitting opposite vertical movement of the opposite ends of each walking beam to permit independent upward movement of said axle ends; the combination therewith of means connecting the ends of said axles to the ends of said walking beams with such connecting means for at least one of said axles comprising a bearing member journalled on each end of said one of said axles for oscillation about a generally horizontal axis extending transversely of said frame, a saddle structure carried by each of said bearing members and including vertical side plates arranged along opposite sides of the corresponding tubular walking beam, a cross member connecting said side plates and extending through openings in the sides of the corresponding tubular walking beam, a rubber pad housed within the corresponding tubular walking beam and mounted on top of each of said cross members below and compressed downwardly by the corresponding walking beam, said pad flexing horizontally lengthwise of said axles to permit movement of said saddle structure and axle lengthwise of said axles.

2. The combination set forth in claim 1 wherein said saddle structure includes a second cross member above the corresponding walking beam connecting said side plates, and additionally including a rubber rebound pad compressively interposed between each second cross member and the corresponding walking beam.

3. In a tandem axle spring suspension adapted to be interposed between a vehicle frame and a pair of tandem axles with rubber tired wheels journalled at the ends thereof and the suspension having compensating means at each side of the frame supporting said frame on the adjacent axle ends and distributing the frame and load weight approximately equally to said adjacent axle ends; the combination therewith of means connecting the ends of said axles with said compensating means, said connecting means for the ends of at least one of said axles comprising a bearing member journalled on each end of said one of said axles for oscillation about a generally horizontal axis extending transversely of said frame, a saddle structure carried by each of said bearing members and including a portion extending underneath an adjacent part of the corresponding compensating means, means mounting each of said compensating means directly on said underneath portions of said saddle structures to permit movement of said saddle structures and axles lengthwise of said axles, and means translating said movement of said saddle structures lengthwise of said axles into movement of the saddle structure at one side of the frame toward the front of the frame and movement of the saddle structure at the other side of the frame toward the rear of the frame, these movements being such as to render at least said one of said axles self-steering, comprising guide means between each saddle structure and each compensating means including at least one vertical guide plate mounted on each saddle structure, and said guide plates being arranged at oblique included angles with reference to the axis of their common axle, and a vertical guide plate arranged to have face engagement with said first mentioned guide plate and mounted on the corresponding compensating means, the mounting for one of said guide plates of each pair including a vertical pivot pin and bearing permitting said one of said guide plates to swivel about a vertical axis and thereby permit the pivoted guide plate to come into full face contact with its companion guide plate.

4. In a tandem axle spring suspension adapted to be interposed between a vehicle frame and a pair of tandem axles with rubber tired wheels journalled at the ends thereof and the suspension having compensating means at each side of the frame supporting said frame on the adjacent axle ends and distributing the frame and load weight approximately equally to said adjacent axle ends; the combination therewith of means connecting the ends of said axles with said compensating means, said connecting means for the ends of at least one of said axles comprising a bearing member journalled on each end of said one of said axles for oscillation about a generally horizontal axis extending transversely of said frame, a saddle structure carried by each of said bearing members and including a portion extending underneath an adjacent part of the corresponding compensating means, means mounting each of said compensating means directly on said underneath portions of said saddle structures to permit movement of said saddle structures and axles lengthwise of said axles, said means mounting each of said compensating means on each of said saddle structures comprising at least one rubber pad mounted on top of each of said underneath portions of said saddle structures and flexing vertically and also flexing horizontally lengthwise of said axles to permit said movement of said saddle structures and axles lengthwise of said axles, and resilient rebound means interposed between each saddle structure and the corresponding compensating means in position to yieldingly resist downward movement of said one of said axles relative to said compensating means.

5. In a tandem axle spring suspension adapted to be interposed between a vehicle frame and a pair of tandem axles each with rubber tired wheels journalled at the ends thereof and the suspension having a walking beam at each side of the frame with its ends adjacent the corresponding axle ends, and means resiliently supporting said frame on the central portions of said walking beams and permitting opposite vertical movement of the opposite ends of each walking beam to permit independent upward movement of said axle ends; the combination therewith of means connecting the ends of said axles to the ends of said walking beams with such connecting means for at least one of said axles comprising a bearing member journalled on each end of said one of said axles for oscillation about a generally horizontal axis extending transversely of said frame, a saddle structure carried by each of said bearing members and including a portion extending under an adjacent part of the corresponding walking beam, means mounting the corresponding end of each of said walking beams directly on said underneath portions of said saddle structures to permit movement of said saddle structures and axles lengthwise of said axles, and guide means between each saddle structure and its walking beam translating said movement of said saddle structures lengthwise of said axles into movement of the saddle structure at one side of the frame toward the front of the frame and movement of the saddle structure at the other side of said frame toward the rear of said frame, these movements being such as to render at least said one of said axles self-steering, said guide means including at least one vertical guide plate mounted on each saddle structure and said guide plates being arranged at oblique included angles with reference to the axis of their common axle, and a vertical guide plate arranged to have face engagement with said first mentioned guide plate and mounted on the corresponding walking beam end, the mounting for at least one of said guide plates of each pair including a vertical pivot pin and bearing permitting said one of said guide plates to swivel about a vertical axis and thereby permit the pivoted guide plate to come into full face contact with its companion guide plate.

References Cited by the Examiner
UNITED STATES PATENTS

| | | | |
|---|---|---|---|
| 531,910 | 1/95 | Cloud | 267—4 |
| 2,193,567 | 3/40 | Pointer | 280—104.5 |
| 2,739,821 | 3/56 | Hickman | 280—104.5 |
| 2,982,580 | 5/61 | Lewis | 280—106 |
| 3,066,948 | 12/62 | Cain | 280—104.5 |
| 3,069,184 | 12/62 | Hickman | 280—104.5 |
| 3,099,459 | 7/63 | Zalar | 280—104.5 |

MILTON BUCHLER, *Primary Examiner.*

A. HARRY LEVY, *Examiner.*